(No Model.)

S. RAY.
GRAIN DIVIDER.

No. 383,542. Patented May 29, 1888.

Witnesses.
M. A. Barnes.
S. Specht.

Inventor:
Servin Ray.
By R. S. & A. P. Lacey,
Attys.

UNITED STATES PATENT OFFICE.

SEVRIN RAY, OF ALDERLEY, WISCONSIN.

GRAIN-DIVIDER.

SPECIFICATION forming part of Letters Patent No. 383,542, dated May 29, 1888.

Application filed December 13, 1887. Serial No. 257,707. (No model.)

*To all whom it may concern:*

Be it known that I, SEVRIN RAY, a citizen of the United States, residing at Alderley, in the county of Dodge and State of Wisconsin, have invented certain new and useful Improvements in Grain-Dividers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to grain dividers for harvesting-machines.

The farmer nowadays cultivates the ground close to the fence, and when harvesting the grain a swath is first cradled around the field for the harvesting-machine to run in, which is a very laborious proceeding, or else the machine is set to work at once, and in cutting the first swath the drive-wheel rolls down all the grain standing in its path and presses it into the ground. The drive-wheel is eight to ten inches wide, more or less, and in a large field the grain that would be lost by being crushed into the earth by such wheel would be very great.

The object of the present invention is to do away with the expensive and laborious operation of cradling a swath around the field and enable the farmer to put the machine to work at once without the danger of the drive-wheel crushing and destroying any very great amount of grain.

The improvement consists of a grain-divider composed of two side bars having their rear ends bent back upon themselves and their front ends converging and united. A short bar, extending rearwardly and upwardly from the closed end, is provided with a rod having a hook on its inner end to adjustably connect the front end of the divider with the frame. The bent ends of the side bars extend inward for a twofold purpose: to permit the side bars to extend back some distance on each side of the drive-wheel, and to afford a means of attachment between the divider and the machine without interrupting the smoothness of the said side bars.

The improvement further consists of the novel features more fully hereinafter set forth and claimed, and shown in the annexed drawings, in which—

Figure 1:
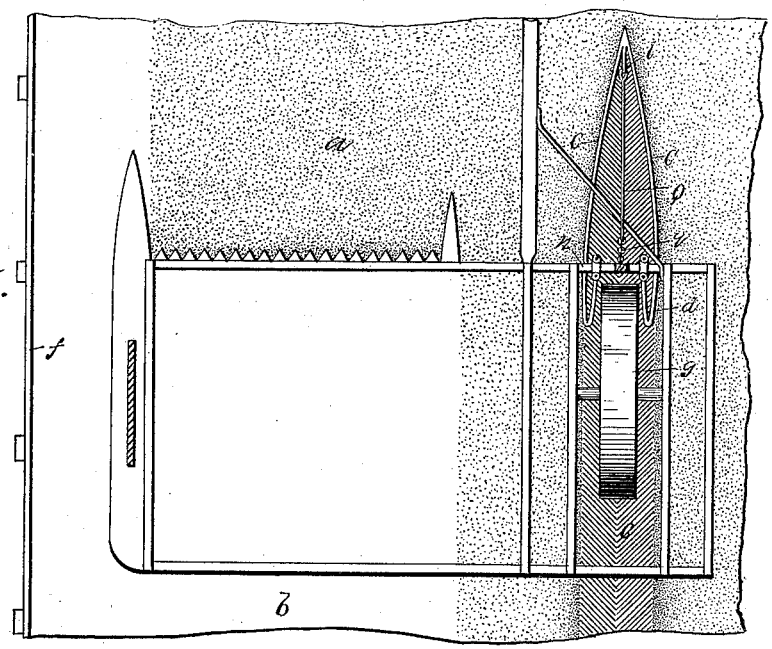
Figure 2:
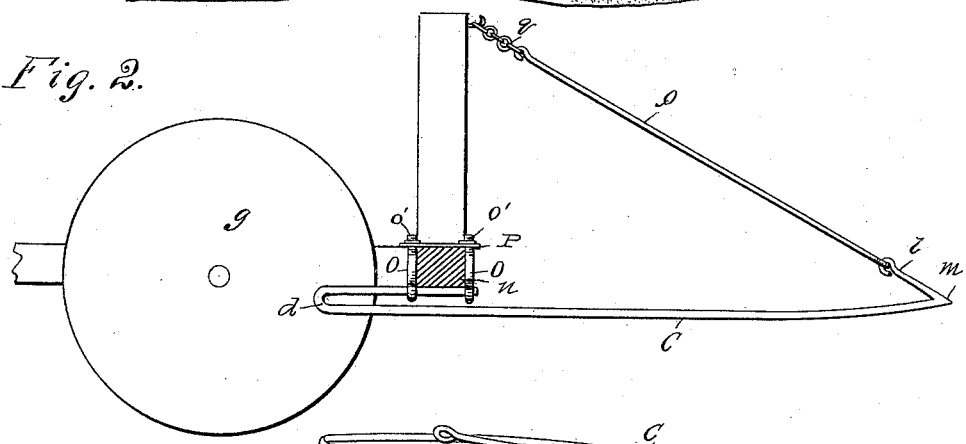
Figure 3:
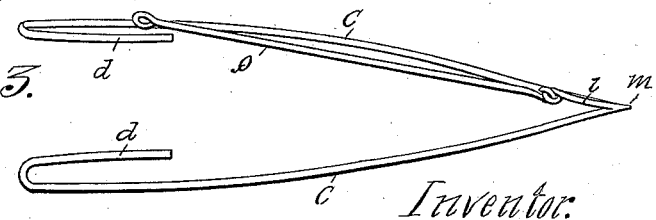

Figure 1 is a plan view of a frame of a harvester embodying my invention, showing the operation of the grain-divider. Fig. 2 is a side view of the grain-divider, showing a portion of the harvester-frame and drive-wheel, on an enlarged scale. Fig. 3 is a detail perspective view of the grain-divider.

The grain-divider, composed of the side bars, C, converging and united at a point at their front ends, and having their rear ends, d, bent back upon themselves, has the short bar l projecting upwardly from the closed end or point m of the divider. The divider is secured to the front sill, n, of the harvester-frame by any suitable devices applied to the bent ends d of the side bars, C, as the eyebolts o, having the end d passed through their eyes, the yoke-plate P, and the nuts o′, screwed on the threaded ends of the eyebolts. The grain-divider is located in front of the drive-wheel g, and its rear ends extend back on each side of the drive-wheel some distance to prevent the grain springing up and coming in front of the drive-wheel. The rod Q, fastened to l and having a hook at its inner end, is adjustably connected with a short chain, q, on the harvester-frame to regulate the pitch of the grain-divider to adapt it to the inclination of the harvester-frame. The side bars, C, are sufficiently stout to withstand the pressure of grain, yet are light enough to permit them to yield when raising or lowering the front end of the divider. The ends d, being bent, also assist in giving spring to the side bars, and by having them curve inward the grain will not catch on the eyebolts, which are within the side bars.

Fig. 1 represents a harvesting-machine provided with my grain-divider cutting the first swath around a field. *a* is the standing grain; *b*, the swath; *f*, the fence, and *c* the path of the drive-wheel, showing the grain divided. The heads of the grain are not crushed into the earth by the drive-wheel, as they are pushed out of its path by the grain-divider when cutting the first swath. On cutting the second swath the grain previously in the path of the drive-wheel is harvested along with the other grain. The rods Q and l incline upwardly from the end of the divider, and serve to separate the tangled ends of the grain.

Having thus described my invention, what I claim, and desire to secure by Letters Patent, is—

1. The combination, with the main wheel of a harvester, of the grain-divider composed of two side bars converging at their front ends, and having their rear ends connected with the wheel-frame of the harvester, and the connection between said front end and the upright frame of the harvester, substantially as described.

2. The combination, with the main wheel of a harvester, of the grain-divider having side bars, the rear ends of the side bars being bent back on themselves, and means for connecting the bent ends with the harvester frame, substantially as described.

3. The combination, with the main wheel of a harvester, of the side bars, C, having their front ends converging and having their rear ends bent back upon themselves and curving inward, the short bar $l$, the rod Q, having a hook on its inner end, the short chain, and means, as the eyebolts $o$ and yoke P, for securing the side bars to the frame of the harvester, substantially as described.

4. The herein-described grain-divider, composed of the elastic converging side bars having their rear ends bent back on themselves and curved inwardly, the short bar $l$ at their points, and the rod Q, having a hook at its free end, substantially as described.

In testimony whereof I affix my signature in presence of two witnesses.

SEVRIN RAY.

Witnesses:
CHRISTOPHER RAY,
MARTIN SORERSEN.